United States Patent Office 3,839,546
Patented Oct. 1, 1974

3,839,546
PREPARATION OF ULTRAHIGH PURITY ANHYDROUS ALKALI METAL HALIDE POWDERS
Khodabakhsh S. Mazdiyasni, Xenia, Ohio, assignor to the United States of America as represented by the Secretary of the Air Force
No Drawing. Filed Aug. 29, 1972, Ser. No. 284,522
Int. Cl. C01d 3/00, 3/04, 3/14
U.S. Cl. 423—499    11 Claims

ABSTRACT OF THE DISCLOSURE

A method of preparing alkali metal halide powders is disclosed which comprises reacting an alkali metal with an anhydrous alcohol and then reacting the resulting alkali metal alkoxide with dry hydrogen halide gas or silicon tetrahalide to form the alkali metal halide. An ultrahigh purity, anhydrous product is obtained in the form of a powder of submicron size that is particularly useful for high performance laser window-type applications.

FIELD OF THE INVENTION

This invention relates to a method for the preparation of ultrahigh purity, anhydrous alkali metal halide powders of submicron size.

BACKGROUND OF THE INVENTION

Various methods are described in the literature for preparing alkali metal halides. For example, lithium chloride is usually prepared by converting lithium sulfate to the carbonate and then to the chloride, or by neutralization of lithium hydroxide with hydrochloric acid. The lithium chloride so prepared contains impurities in the form of salts, such as potassium chloride, sodium chloride, potassium sulfate or sodium sulfate. As proposed in U.S. Pat. No. 3,278,260, substantially pure lithium chloride can be made by dissolving lithium chloride containing contaminating salts in an alcohol and thereafter recovering the lithium chloride from the alcohol solution. U.S. Pat. No. 3,431,068 discloses a method for preparing alkali metal halides that are substantially free of halates. According to this prior art method elemental bromine or iodine are reacted with an alkali metal hydroxide in a liquid saturated alcohol or ketone or a liquid saturated aldehyde. While the methods described in the literature may be suitable for producing alkali metal halides for many applications, they have not proven to be entirely satisfactory for providing products that meet the stringent requirements for use in high performance laser window-type applications.

It is an object of this invention, therefore, to provide a method for producing extremely pure, anhydrous alkali metal halides.

Another object of the invention is to provide a method for preparing alkali metal halides in quantitative yields.

A further object of the invention is to provide a simplified method for producing ultrahigh purity, anhydrous alkali metal halides that does not require expensive and complicated purification procedures.

Other objects and advantages of the invention will become apparent to those skilled in the art upon consideration of the accompanying disclosure.

SUMMARY OF THE INVENTION

The present invention resides in a method for preparing ultrahigh purity, anhydrous alkali metal halides comprising the steps of reacting in an inert atmosphere an alkali metal with an anhydrous primary alcohol, thereby obtaining an alkali metal alkoxide, reacting the alkali metal alkoxide with a hydrogen halide gas or a silicon tetrahalide, and recovering a halide of the alkali metal in the form of a crystalline powder.

The reactions involved in conducting the method of this invention are shown by the following formulae:

$$M + ROH \rightarrow MOR + \tfrac{1}{2}H_2\uparrow \qquad (1)$$

$$MOR + HX \rightarrow MX + ROH \qquad (2)$$

or $$4MOR + SiX_4 \rightarrow 4MX + Si(OR)_4 \qquad (3)$$

In the foregoing formulae, M is an alkali metal, such as, sodium, potassium or lithium, R is an alkyl radical containing 1 to 5, inclusive, carbon atoms, and X is a halogen, i.e., chlorine, bromine, fluorine, or iodine.

In conducting the reaction of equation (1) at least stoichiometric amounts of the reactants are utilized. However, it is usually preferred to employ an excess of the alcohol, e.g., a stoichiometric excess of about 20 to 100 percent. Examples of alcohols that can be used include methanol, ethanol, n-propanol, isopropanol, normal butanol, and isoamyl alcohol. The reaction is carried out in the presence of an inert gas, such as helium, nitrogen or argon.

The alkali metal used in the reaction is a high purity product while the alcohol is anhydrous. The alcohol can be treated to ensure that it is anhydrous by methods that are well known in the art. For example, prior to use the alcohol can be contacted with a desiccant or subjected to distillation. The reaction between the alkali metal and the alcohol is exothermic and proceeds to a yield of essentially 100 percent. However, because the reaction is exothermic, the reaction temperature is maintained below room temperature, e.g., in the range of about 10 to 20° C. The cooling can be conveniently accomplished by placing the reaction vessel in a Dry Ice bath. The reaction proceeds to completion quite rapidly, the time required being largely dependent upon the quantity of reactants involved.

After the reaction represented by equation (1) is completed, stoichiometric amounts of a hydrogen halide gas or a silicon tetrachloride are charged to the reaction vessel. These reactions also proceed exothermically to an essentially 100 percent yield and are conducted under an inert atmosphere. When a hydrogen halide, such as hydrogen chloride, hydrogen bromide or hydrogen fluoride gas is employed as shown in equation (2), the reaction is carried out at below room temperature, e.g., from about 10 to 20° C. The reaction vessel can, therefore, remain in the ice bath used in the initial reaction. However, the reaction using a silicon tetrahalide, such as silicon tetrachloride or silicon tetrabromide, does not proceed as violently as when a hydrogen halide gas is employed so that above room temperatures, e.g., about 20 to 30° C., can be employed.

As with the initial reaction, the reaction time for the reactions illustrated by equations (2) and (3) will depend primarily upon the quantity of reactants involved. Upon completion of the reactions, the reaction mixtures are generally brought to reflux temperature to ensure that there are no unreacted materials. Thereafter, the reaction mixtures are fractionally distilled under a vacuum to remove the alcohol or silicon alkoxide by-products, depending upon the particular reaction. The resulting residue is then washed several times with an alcohol or a hydrocarbon, preferably an aromatic hydrocarbon such as benzene, and then filtered in a drybox under anhydrous conditions to ensure removal of any impurities. When using an alcohol in the washing step, it is preferred to use the same alcohol as is employed in the method. The white crystalline alkali metal halide powders of submicron size that the obtained in a 100 percent yield are then dried under a vacuum. The drying can be conveniently accomplished by heating the product in a vacuum oven, e.g., at about 40 to 60° C. for a period of 8 to 48 hours.

After drying the product is stored under anhydrous conditions, e.g., under a vacuum or an atomosphere of an anhydrous inert gas or a hydrogen halide gas.

A more complete understanding of the invention can be obtained by referring to the following illustrative examples which are not intended, however, to be unduly limitative of the invention.

EXAMPLE I

To a 500 ml. flask equipped with a reflux condenser and drying tube, there was added 100 ml. of anhydrous isopropanol and 39.1 grams of high purity (99.99+%) chunks of potassium. The flask was positioned in a Dry Ice bath and the reactants in the flask were maintained in an inert atmosphere of helium. The potassium reacted exothermically with the alcohol, forming potassium isopropoxide and giving off hydrogen. The potassium isopropoxide was then reacted with a stoichiometric amount of hydrogen chloride gas which was introduced into the flask. After completion of the reaction of the potassium isopropoxide with the hydrogen chloride gas, the ice bath was removed and the reaction mixture was heated at reflux temperature for several minutes. The alcohol by-product was then removed by filtration at room temperature under an anhydrous inert atmosphere or by fractional distillation at 50° C. under a vacuum of 0.2 mm. of Hg. The residue remaining was washed several times with benzene and filtered in a drybox to ensure removal of any impurities while maintaining anhydrous conditions. A 100 percent yield of potassium chloride in the form of white crystalline submicron size crystals was obtained. The crystalline product was then dried in a vacuum oven at 50° C. for a period of 24 hours. The product was thereafter stored under hydrogen chloride gas.

Wet chemical analysis of the product indicated only potassium chloride. The emission spectrographic analysis for major impurities showed about 100 p.p.m. sodium with no other impurities being found. The infrared spectra of the powder were examined with no evidence of $OH^-$ being present in the crystal lattice. The thermogravametric analysis of a sample of the product indicated 1 percent weight loss up to 650° C. which was attributed to surface absorbed organic solvent used in the synthesis.

The particle size of the powdered product was determined by viewing in an electron microscope a diseprsion of the powder in an absolute ethyl alcohol sprayed onto a carbon substrate on a copper mesh screen. The results indicated that the very fine potassium halide particulates, prepared as described at about room temperature, had cubical symmetry with a mean particle size of 50–75 angstroms. Powder calcined for 30 minutes at 650° C. showed a greater degree of crystallinity as well as cubical symmetry with a mean particle size of 200 angstroms. The X-ray powder pattern of the material as prepared, after calcining at 650° C. for 30 minutes using $CuK_\alpha$ radiation, agreed well with the ASTM value for face centered cubic symmetry.

EXAMPLE II

A run was carried out in which potassium chloride powder was prepared, following essentially the same procedure as described in Example I. However, instead of using hydrogen chloride gas in the second reaction, silicon tetrachloride was employed. Also, the reaction between the potassium isopropoxide and the silicon tetrachloride was conducted at about room temperature and silicon isopropoxide was removed as a by-product by vacuum distillation. The potassium chloride product obtained was substantially identical to the product described in Example I.

EXAMPLE III

A run was carried out in which high purity, anhydrous sodium bromide powder was prepared by initially reacting sodium metal with an excess of methanol. To the sodium methoxide that was obtained, there was then added hydrogen bromide gas. The procedure followed and conditions under which the run was conducted were essentially the same as those described in Example I. The sodium bromide product was of an ultrahigh purity and in the form of submicron size powder.

Modifications of the present invention can be made by those skilled in the art in view of the foregoing disclosure. Such modifications fall within the spirit and scope of the present invention.

I claim:
1. A method of preparing utrahigh purity, anhydrous alkali metal halide powders of submicron size, said method comprising the steps of:
    (1) reacting as the sole reactants in an anhydrous inert atmosphere an alkali metal with at least a stoichiometric amount of an anhydrous alcohol corresponding to the formula ROH, where R is an alkyl radical containing 1 to 5, inclusive, carbon atoms, thereby forming an alkali metal alkoxide corresponding to the formula MOR, where M is an alkali metal and R is as defined hereinbefore, the reaction being conducted at a temperature in the range of about 10 to 20° C.;
    (2) reacting as the sole reactants in an anhydrous inert atmosphere stoichiometric amounts of the alkali metal alkoxide and a member selected from the group consisting of an anhydrous hydrogen halide gas and a silicon tetrahalide, thereby forming a reaction mixture containing an alkali metal halide, the reaction being conducted at a temperature in the range of about 10 to 20° C. when said member is a hydrogen halide and at a temperature in the range of about 20 to 30° C. when said member is a silicon tetrahalide; and
    (3) recovering the alkali metal halide from the reaction mixture by fractionally distilling alcohol from the reaction mixture when said member is a hydrogen halide and silicon alkoxide from the reaction mixture when said member is a silicon tetrahalide, washing the remaining alkali metal halide with an aromatic hydrocarbon, filtering the washed alkali metal halide, and drying the filtered material to provide while crystalline alkali metal halide powder of submicron size.

2. The method according to claim 1 in which the amount of alcohol used is about 20 to 100 percent in excess of stoichiometry.

3. The method according to claim 1 in which the alkali metal is sodium, the alcohol is methanol, the member is hydrogen bromide gas, and sodium bromide is recovered as the product of the method.

4. The method according to claim 1 in which the alkali metal is lithium, the alcohol is n-butanol, the member is hydrogen chloride gas, and lithium chloride is recovered as the product of the method.

5. The method according to claim 1 in which the alkali metal is potassium, the alcohol is ethanol, the member is hydrogen bromide gas, and potassium bromide is recovered as the product of the method.

6. The method according to claim 1 in which the filtered material is dried under a vacuum at about 40 to 60° C. for a period of 8 to 48 hours.

7. A method of preparing ultrahigh purity, alkali metal halide powders of submicron size, said method comprising the steps of:
    (1) reacting in an anhydrous inert atmosphere an alkali metal with at least a stoichiometric amount of an alcohol corresponding to the formula ROH, where R is an alkyl radical containing 1 to 5, inclusive, carbon atoms, thereby forming an alkali metal alkoxide corresponding to the formula MOR, where M is an alkali metal and R is as defined hereinbefore, the reaction being conducted at a temperature in the range of about 10 to 20° C.;

(2) reacting in an anhydrous inert atmosphere stoichiometric amounts of the alkali metal alkoxide and a silicon tetrahalide, thereby forming a reaction mixture containing an alkali metal halide, the reaction being conducted at a temperature in the range of about 20 to 30° C.;

(3) recovering the alkali metal halide from the reaction mixture by fractionally distilling silicon alkoxide from the reaction mixture, washing the remaining alkali metal halide with an aromatic hydrocarbon, filtering the washed alkali metal halide, and drying the filtered material to provide white crystalline alkali metal halide powder of submicron size.

8. The method according to claim 7 in which the amount of alcohol used is about 20 to 100 percent in excess of stoichiometry.

9. The method according to claim 7 in which the alkali metal is potassium, the alcohol is isopropanol, the silicon tetrahalide is silicon tetrachloride, and potassium chloride is recovered as the product of the method.

10. The method according to claim 7 in which the alkali metal is sodium, the alcohol is methanol, the silicon tetrahalide is silicon tetrabromide, and sodium bromide is recovered as a product of the method.

11. The method of preparing ultrahigh purity, anhydrous potassium chloride powders of submicron size, said method comprising the steps of:

(1) reacting as the sole reactants in an anhydrous inert atmosphere potassium with at least a stoichiometric amount of anhydrous isopropanol, thereby forming potassium isopropoxide, the reaction being conducted at a temperature in the range of about 10 to 20° C.;

(2) reacting as the sole reactants in an anhydrous inert atmosphere stoichiometric amounts of the potassium isopropoxide and anhydrous hydrogen chloride gas, thereby forming a reaction mixture containing potassium chloride, the reaction being conducted at a temperature in the range of about 10 to 20° C.; and (3) recovering potassium chloride by fractionally distilling isopropanol from the reaction mixture, washing the remaining potassium chloride with an aromatic hydrocarbon, filtering the washed potassium chloride, and drying the filtered material to provide white crystalline potassium chloride powder with a mean particle size of 50 to 75 angstroms.

References Cited
UNITED STATES PATENTS

| | | | |
|---|---|---|---|
| 2,958,574 | 11/1960 | Hansley et al. | 423—499 |
| 3,111,381 | 11/1963 | Panzer et al. | 423—499 |
| 3,114,602 | 12/1963 | Wood | 423—499 X |
| 3,278,260 | 10/1966 | Herman | 423—197 |

EDWARD STERN, Primary Examiner

U.S. Cl. X.R.

423—197